(12) United States Patent
Sogawa

(10) Patent No.: US 7,106,365 B1
(45) Date of Patent: Sep. 12, 2006

(54) STEREO CAMERA APPARATUS WITH A MAIN CAMERA AND A SUB-CAMERA WHERE THE SUB-CAMERA HAS A POINT OF VIEW DIFFERENCE FROM THE POINT OF VIEW OF THE MAIN CAMERA

(75) Inventor: Yoshiyuki Sogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 659 days.

(21) Appl. No.: 09/667,424

(22) Filed: Sep. 21, 2000

(30) Foreign Application Priority Data

Sep. 22, 1999 (JP) ............................. P. 11-269552

(51) Int. Cl.
*H04N 5/228* (2006.01)

(52) U.S. Cl. ..................... 348/222.1; 348/47; 348/148; 348/207.99; 382/154

(58) Field of Classification Search ................ 348/373, 348/116, 333.06, 118, 148, 222.1, 207.99; 358/88, 229, 3, 209; 352/57; 382/106, 154; 356/3, 314, 12; 396/128
See application file for complete search history.

(56) References Cited

U.S. PATENT DOCUMENTS

| | | | | |
|---|---|---|---|---|
| 4,879,596 A | * | 11/1989 | Miura et al. ................. | 348/47 |
| 4,926,346 A | * | 5/1990 | Yokoyama ................... | 701/28 |
| 4,978,983 A | | 12/1990 | Stalfors | |
| 5,063,441 A | * | 11/1991 | Lipton et al. ................. | 348/47 |
| 5,410,346 A | * | 4/1995 | Saneyoshi et al. .......... | 348/116 |
| 5,424,952 A | * | 6/1995 | Asayama .................... | 348/118 |
| 5,473,364 A | * | 12/1995 | Burt ............................. | 348/47 |
| 5,530,420 A | | 6/1996 | Tsuchiya et al. | |
| 5,652,616 A | | 7/1997 | Chen et al. | |
| 5,915,033 A | * | 6/1999 | Tanigawa et al. ........... | 382/106 |
| 6,236,748 B1 | * | 5/2001 | Iijima et al. ................. | 382/154 |

FOREIGN PATENT DOCUMENTS

| | | |
|---|---|---|
| EP | 0 738 872 | 10/1996 |
| EP | 0 942 610 A2 | 9/1999 |
| GB | 2 313 977 | 12/1997 |
| JP | 09 097342 | 4/1997 |
| WO | WO 94/10604 | 5/1994 |

OTHER PUBLICATIONS

European Search Report, dated Mar. 21, 2003, Issued by the European Patent Office, for European Patent Application No. EP00119921.5. (pp. 1-3).

* cited by examiner

*Primary Examiner*—David Ometz
*Assistant Examiner*—Gevell Selby
(74) *Attorney, Agent, or Firm*—Smith, Gambrell & Russell

(57) ABSTRACT

A stereo camera unit 2 is constructed mainly of a main camera 4, a sub-camera 5 and a camera stay 3. The main camera 4 and the sub-camera 5 are assembled to the camera stay 3 in such a way that they are inclined toward the main camera 4 side with respect to a central axis of the vehicle.

10 Claims, 4 Drawing Sheets

STEREO CAMERA APPARATUS WITH A MAIN CAMERA AND A SUB-CAMERA WHERE THE SUB-CAMERA HAS A POINT OF VIEW DIFFERENCE FROM THE POINT OF VIEW OF THE MAIN CAMERA

BACKGROUND OF THE INVENTION

1. Field of the Invention

The present invention relates to a structure for mounting a stereo camera apparatus which takes photograph of an object from different points of view for calculating a three-dimensional distance distribution of the object.

2. Description of the Related Art

Generally, image processing by a so-called stereo method is known as an image-based three-dimensional measuring technique. In this stereo method, an object is photographed from different positions with a stereo camera apparatus which is composed of a pair of cameras, or a main camera and a sub-camera. Then a distance between the stereo camera apparatus and the object is determined from a parallax of the same object using camera parameters based on the principle of triangulation. Camera parameters are, for example, the mounting position, focal length of the stereo camera apparatus and the like.

Specifically, in such image processing using the stereo method, a small region in a reference image photographed by the main camera is superimposed on an area within search area set in a comparative image photographed by the sub-camera while successively shifting the small region pixel by pixel. Then, a position of an area within the search area corresponding to the small region of the reference image is obtained, the corresponding area having image signal coincident with image signal of the small region. Information on the distance to the object is then obtained from a positional difference (parallax) of the same object on the pair of the images, or the reference image and the comparative image, using the principle of triangulation.

The stereo camera apparatus used in the aforementioned image processing is installed such that it is oriented to a front of a vehicle, or in an axis direction of the vehicle. A search area to be set in the comparative image is set in a striplike area as shown in FIG. 2A, which extends from a position substantially corresponding to a small region in the reference image toward the main camera. Therefore, as is apparent from FIGS. 2B and 2C, for a small region located in a specific zone of the outside (right side) of the vehicle in the reference image, it is impossible to allocate a corresponding search area in the comparative image and obtain distance information thereon. For this reason, an area in which a three-dimensional distance distribution is generated by the aforementioned image processing is inclined toward the sub-camera side (left side) with respect to the central axis of the vehicle as shown in FIG. 2D. Consequently, it might be impossible to obtain a three-dimensional distance distribution having a sufficiently large area for an object to be photographed.

On the other hand, to enable detection of an infinite distance corresponding point where the parallax is zero when searching through the comparative image for a corresponding position of a small region in the reference image, it is necessary to set a search margin in a matching search area in the comparative image as shown in FIG. 4. When the reference image is produced using up to extreme ends of camera frame, however, it becomes impossible to provide the search margin.

SUMMARY OF THE INVENTION

This invention has been made in the consideration of the aforementioned circumstances. An object of the present invention is to provide a structure for mounting a stereo camera apparatus which makes it possible to set a three-dimensional distance distribution symmetrically on left and right sides of the central axis of a vehicle and thereby produce a necessary and sufficient three-dimensional distance distribution.

Another object of the present invention is to set a search margin in such a way that the infinite distance corresponding point can be detected even when the reference image is produced using up to extreme ends of camera frame.

The objects can be achieved by a structure for mounting a stereo camera apparatus comprising a main camera and a sub-camera. The main camera takes photograph of an object in a shooting direction. The sub-camera takes photograph of the object from a point of view different from a point of view of the main camera. The main camera and sub-camera are disposed with a predetermined spacing in a direction substantially perpendicular to the shooting direction. Optical axes of the main camera and the sub-camera are inclined toward the main camera side with respect to the shooting direction between the main camera and the sub-camera. Each of the cameras may be made of CCD camera. The cameras may be mounted in the vicinity of a rear-view mirror of a vehicle, so as to take photographs of views outside the vehicle.

In the structure for mounting the stereo camera apparatus of the invention, it is preferable that the optical axis of the sub-camera is inclined toward the sub-camera side with respect to the optical axis of the main camera.

Further, in the structure of the invention, it is also preferable that angles of inclination of the main camera and the sub-camera are set to be such angles that make an area substantially left-right symmetric with respect to a central axis of a vehicle parallel to the shooting direction, the area being an area of three-dimensional distance distribution obtained on the basis of images photographed by the cameras. The optical axis of the sub-camera may inclined toward the sub-camera side with respect to the optical axis of the main camera.

Furthermore, it is preferable that the structure of the invention further comprises:

a camera stay for mounting the cameras thereon, wherein a longitudinal direction of the camera stay is substantially perpendicular to the shooting direction.

The objects can be also achieved by a structure for mounting a stereo camera apparatus which has a main camera and a sub-camera taking photograph of a common object in a shooting direction from different points of view and being disposed with a predetermined spacing in a baseline direction substantially perpendicular to the shooting direction, the stereo camera apparatus identifying a correlated destination of a first image photographed by the main camera within a second image photographed by the sub-camera and then calculating a parallax of the first image. Optical axes of the main camera and the sub-camera are inclined toward the main camera side with respect to the shooting direction between the main camera and the sub-camera.

In the structure for mounting the stereo camera apparatus of the invention, it is preferable that an acute angle defined between the optical axis of the main camera and the baseline direction is smaller than an acute angle defined between the optical axis of the sub-camera and the baseline direction.

DETAILED DESCRIPTION OF THE PREFERRED EMBODIMENT

Figure 1:
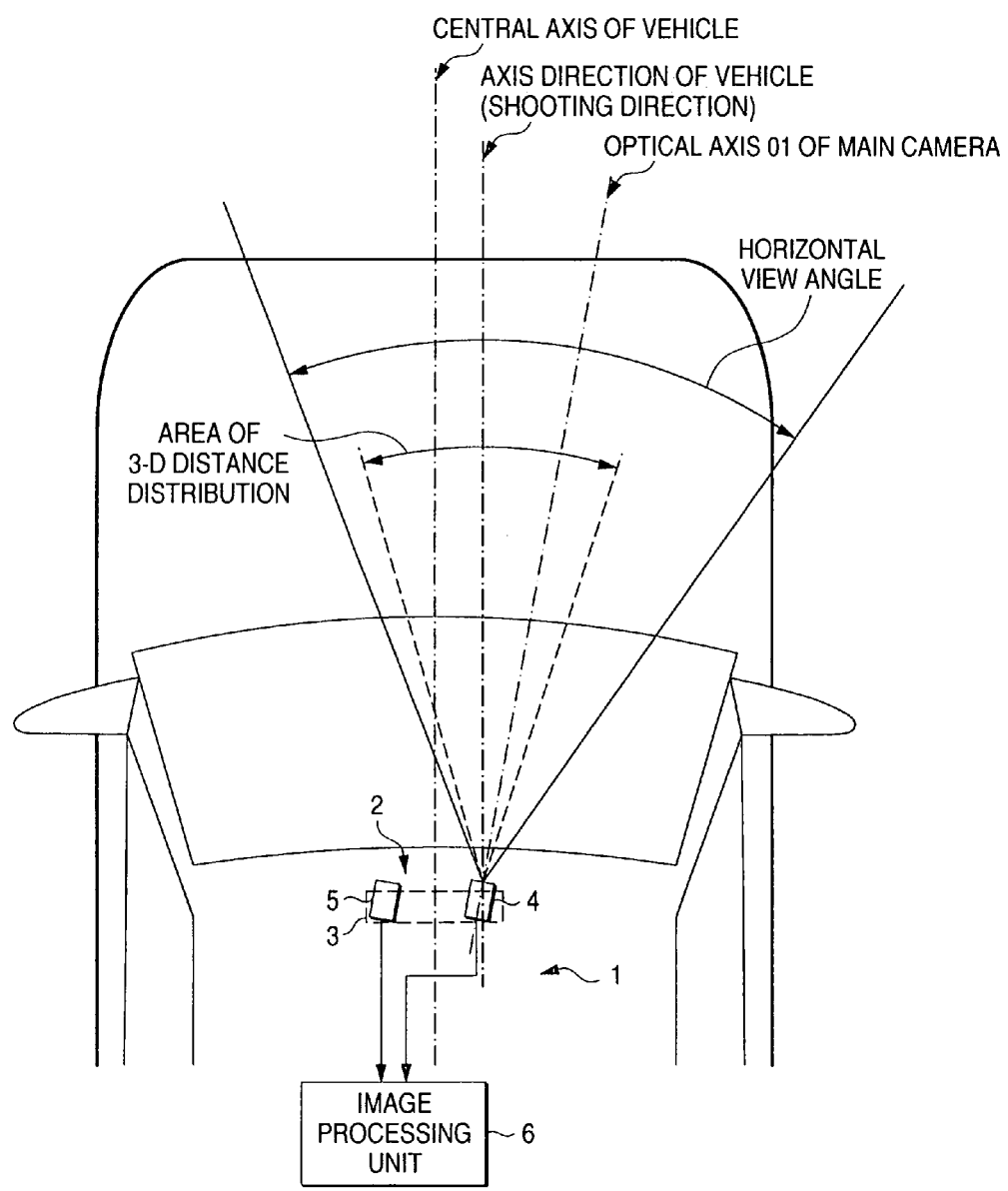
FIG. 1 is a schematic construction diagram of a stereoscopic image processing system.
Figure 2:
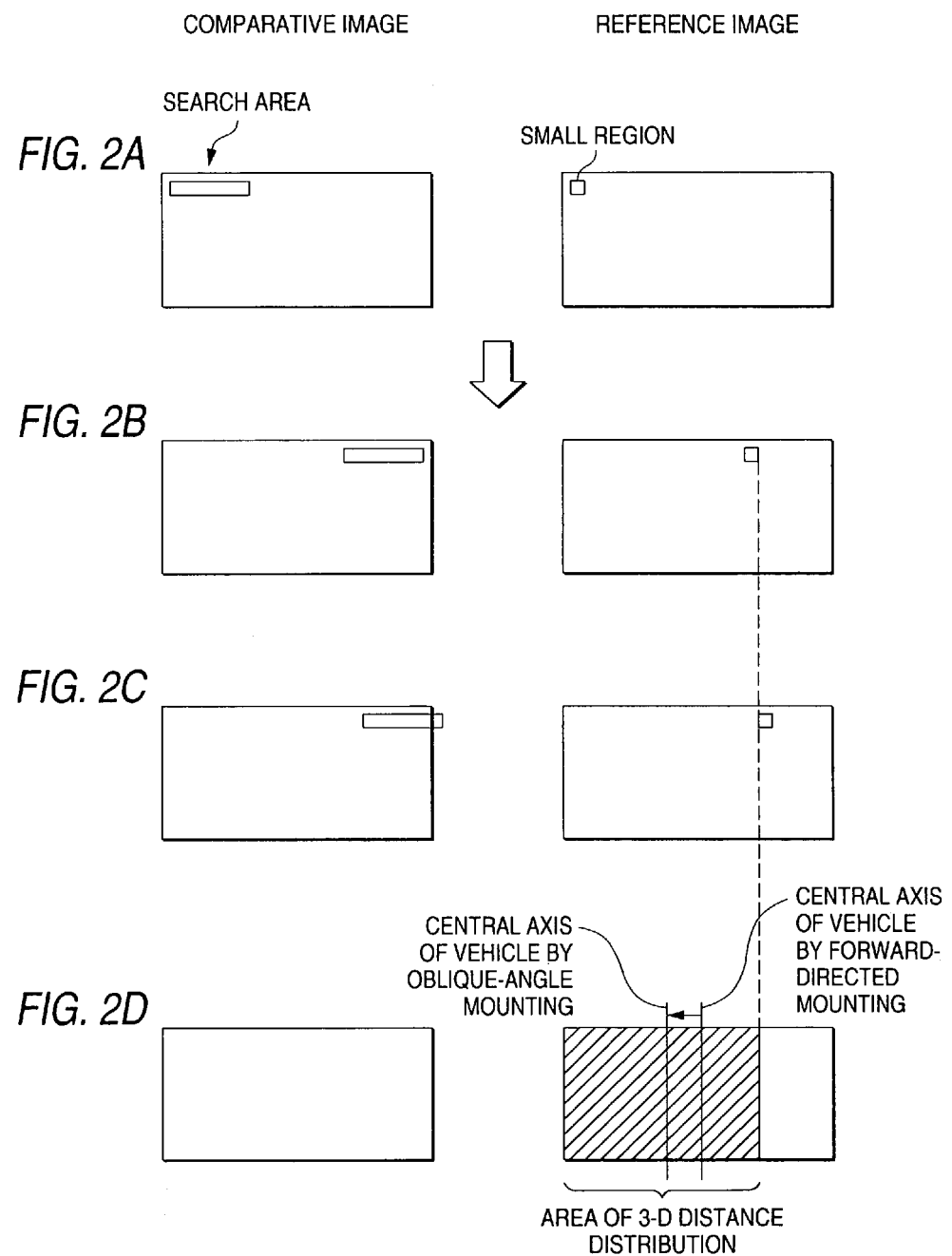
FIGS. 2A–D are respectively explanatory diagrams of a three-dimensional distance distribution.
Figure 3:
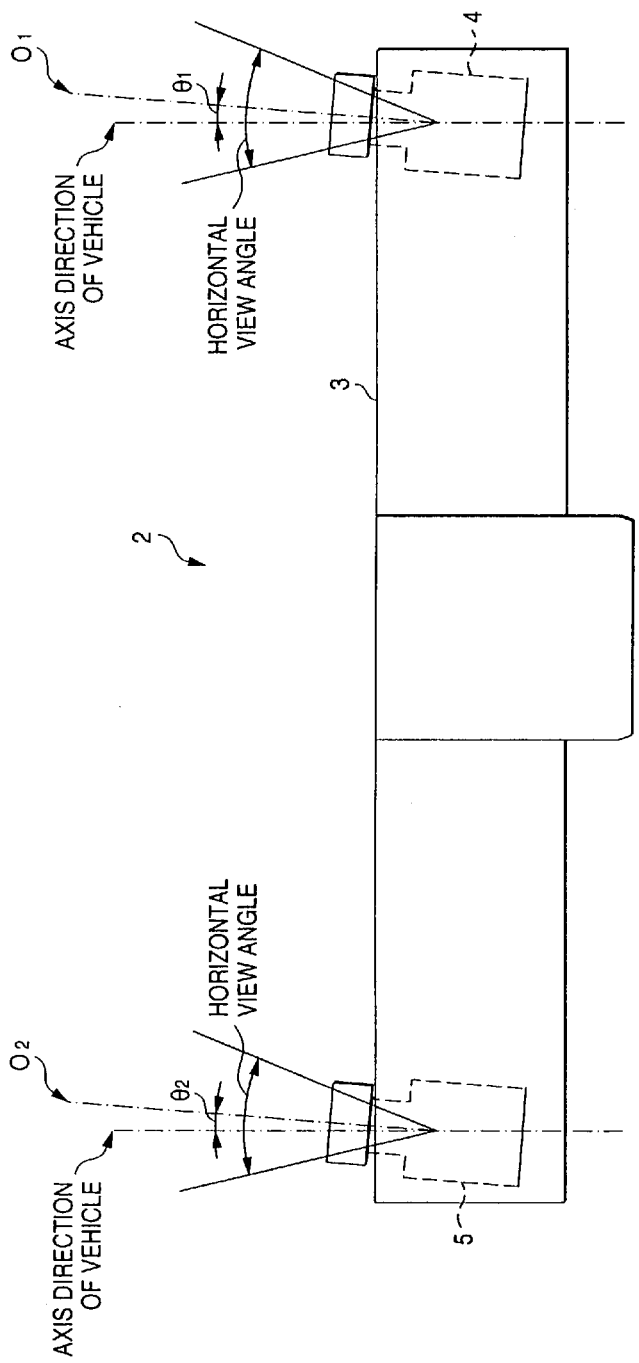
FIG. 3 is a top view of a stereo camera unit.
Figure 4:
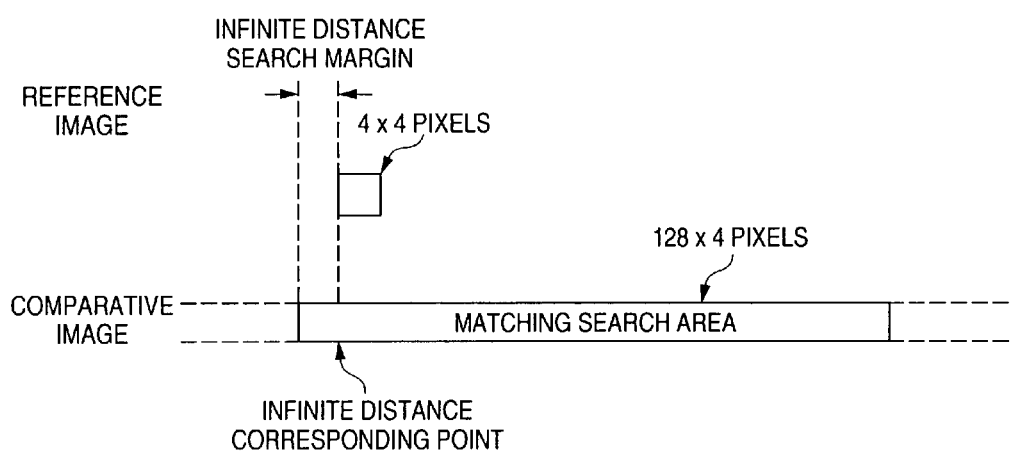
FIG. 4 is a diagram showing a search area in a comparative image necessary for detecting an infinite distance corresponding point.

A mode of carrying out the present invention, or an embodiment thereof, is described below with reference to drawings. FIGS. 1–3 relate to the embodiment of this invention, in which FIG. 1 is a schematic construction diagram of a stereoscopic image processing system, FIGS. 2A–D are respectively explanatory diagrams of areas for generating a three-dimensional distance distribution, and FIG. 3 is a top view of a stereo camera unit.

In FIG. 1, the reference numeral 1 designates the stereoscopic image processing system which is installed on a vehicle like a motor vehicle and recognizes an object ahead of the vehicle. This stereoscopic image processing system 1 comprises a stereo camera unit 2 which takes stereoscopic photographs and an image processing unit 6 which produces a three-dimensional distance distribution of the object ahead of the vehicle by performing a stereoscopic image processing on a pair of images photographed by the stereo camera unit 2.

The aforementioned stereo camera unit 2 is constructed mainly of a main camera 4, a sub-camera 5 and a camera stay 3. The main camera 4 and the sub-camera 5 are both made of CCD cameras, for example, and assembled to the camera stay 3 with a specific distance between them. The camera stay 3 is mounted in the vicinity of a rear-view mirror of the vehicle. The aforementioned main camera 4 is attached to a right end of the camera stay 3 and captures a reference image (right image) which is needed by the aforementioned image processing unit 6 when it performs the stereoscopic image processing. The aforementioned sub-camera 5 is attached to a left end of the camera stay 3 and captures a comparative image (left image) for the aforementioned stereoscopic image processing.

The aforementioned image processing unit 6 calculates the three-dimensional distance distribution of objects outside the vehicle by image processing the reference image and the comparative image photographed by the aforementioned main camera 4 and sub-camera 5, and calculates a relative distance and relative speed between own vehicle and a vehicle running ahead by detecting road shapes and three-dimensional positions of a plurality of three-dimensional objects at a high speed based on the three-dimensional distance distribution information.

Calculation of the three-dimensional distance distribution by the aforementioned image processing unit 6 is now described more specifically. First, this image processing unit 6 sets a search area (e.g., 4×128 pixels) in the comparative image for a small region (e.g., 4×4 pixels) in the reference image as shown in FIGS. 2A and 2B. Then, the image processing unit 6 superimposes the small region on an area within the search area while successively shifting the small region pixel by pixel, and determines a position of an area within the search area corresponding to the small region, the corresponding area having image signal coincident with image signal of the small region. Thus, the image processing unit 6 obtains information on the distance to an object from a positional difference (parallax) of the same object on the two images.

Here, it is impossible to obtain a corresponding search area in the comparative image for small regions located in a specific zone at the right side (toward the main camera 4 side) of the reference image as shown in FIG. 2C. Therefore, an area in which a three-dimensional distance distribution is generated by the image processing unit 6 is inclined toward the left side (toward the sub-camera 5 side) of the reference image as shown in FIG. 2D.

Taking into account the above problem, special consideration is given to a structure for mounting the main camera 4 and the sub-camera 5 on the camera stay 3 in the stereo camera unit 2 of the present embodiment. Specifically, the aforementioned main camera 4 and sub-camera 5 are assembled to the camera stay 3 in such a way that their optical axes O1, O2 are inclined by angles θ1, θ2 toward the main camera 4 side (rightward), respectively, as shown in FIG. 3. In other words, the camera stay 3 is installed in vehicle interior such that its longitudinal direction would become perpendicular to the axial direction of the vehicle (shooting direction) as shown in FIG. 1 and, therefore, the optical axes O1, O2 of the aforementioned main camera 4 and sub-camera 5 are inclined rightward by θ1, θ2 with respect to their shooting direction, respectively.

This is for setting an area of a three-dimensional distance distribution, which is offset toward the sub-camera 5 side (leftward) within the horizontal view angle of the main camera 4, substantially symmetrically on left and right sides of the axial direction of the vehicle as shown in FIG. 1. As a result, although the area of the three-dimensional distance distribution generating area is still offset toward the sub-camera 5 side (leftward) on the reference image as shown in FIG. 2D, the area of the three-dimensional distance distribution produced by the image processing unit 6 is well balanced showing left-right symmetry with respect to own vehicle.

On the other hand, the angle of inclination θ1 of the main camera 4 and the angle of inclination θ2 of the sub-camera 5 are determined to satisfy the relationship θ1>θ2. In other words, the optical axis O2 of the sub-camera 5 is set such that it is inclined toward the sub-camera 5 side (leftward) with respect to the optical axis O1 of main camera 4. This arrangement is made to provide a search margin in the comparative image to enable detection of an infinite distance corresponding point in stereo matching executed by the image processing unit 6 by setting a left end of the comparative image to the outside (leftward) of a left end of the reference image. It is to be noted, however, that such a setting exerts its effects when the reference image is produced using up to extreme ends of camera frame.

The angles of inclination θ1, θ2 of the aforementioned main camera 4 and sub-camera 5 are optimally set depending on their mounting interval, focal length and the number of pixels of each camera, small regions and search area, etc. in stereoscopic image processing.

As thus far described, an area of a three-dimensional distance distribution is set with left-right symmetry with respect to the central axis of a vehicle and a three-dimensional distance distribution having a necessary and sufficient area is obtained according to the present invention.

Also, it becomes possible to search for an infinite distance corresponding point by stereo matching by setting a search margin in a comparative image even when a reference image is produced using up to extreme ends of camera frame.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A stereo camera apparatus comprising:
    a main camera for taking a photograph of an object; and
    a sub-camera for taking a photograph of said object from a point of view different from a point of view of said main camera, said main camera and said sub-camera being disposed with respect to each other by a predetermined spacing,
    a shooting direction of said stereo camera is substantially perpendicular to said predetermined spacing in a baseline between the main camera and the sub-camera,
    image processing means for calculating a three-dimensional distance distribution of said object based on a positional difference between a region in a reference image photographed by said main camera and a corresponding area in a comparative image photographed by said sub-camera to an image signal of said region,
    wherein said corresponding area is searched in a striplike search area having a predetermined length which extends from a position substantially corresponding to said region, said positional difference is obtained from an area which is capable of setting said search area inside of said comparative image,
    wherein optical axes of said main camera and said sub-camera are inclined toward the main camera side with a predetermined angle with respect to the shooting direction defined by each of the optical axes and the shooting direction,
    wherein angles of inclination of said main camera and said sub-camera are set to be such angles that said three-dimensional distance distribution is substantially left-right symmetric with respect to the shooting directions
    wherein angles of inclination of said main camera and said sub-camera are set to be angles such that said three-dimensional distance distribution is substantially left-right symmetric with respect to a central axis of a vehicle parallel to a forward direction of the vehicle, and the shooting direction being parallel to the central axis.

2. The stereo camera apparatus as recited in claim 1, further comprising:
    a camera stay for mounting said cameras thereon, wherein a longitudinal direction of said camera stay is substantially perpendicular to the shooting direction.

3. The stereo camera apparatus as recited in claim 1, wherein each of said camera is a CCD camera.

4. The stereo camera apparatus as recited in claim 1, wherein said cameras are mounted in the vicinity of a rear-view mirror of a vehicle, said cameras taking photographs of views outside the vehicle.

5. The stereo camera apparatus as recited in claim 1, wherein said predetermined length of said search area is longer than length of said region.

6. A stereo camera apparatus comprising:
    a main camera for taking a photograph of an object; and
    a sub-camera for taking a photograph of said object from a point of view different from a point of view of said main camera, said main camera and said sub-camera being disposed with respect to each other by a predetermined spacing,
    a shooting direction of said stereo camera is substantially perpendicular to said predetermined spacing in a baseline between the main camera and the sub-camera,
    image processing means for calculating a three-dimensional distance distribution of said object based on a positional difference between a region in a reference image photographed by said main camera and a corresponding area in a comparative image photographed by said sub-camera to an image signal of said region,
    wherein said corresponding area is searched in a striplike area having a predetermined length which extends from a position substantially corresponding to said region,
    said positional difference is obtained from an area which is capable of setting search area inside of said comparative image,
    wherein said main camera and said sub-camera are inclined toward the main camera side with a predetermined angle with respect to the shooting direction defined by each of the optical axes and the shooting direction,
    wherein angles of inclination of said main camera and said sub-camera are set to be such angles that said three-dimensional distance distribution is substantially left-right symmetric with respect to the shooting direction,
    wherein the optical axis of said sub-camera is inclined toward said sub-camera side with respect to the optical axis of said main camera,
    wherein the optical axis of said sub-camera is inclined toward said sub-camera side with respect to the optical axis of said main camera in order to provide a search margin in a comparative image photographed by said sub-camera to enable detection of an infinite distance corresponding point positioned at an end of said sub-camera side in a reference image taken by said main camera,
    wherein angles of inclination of said main camera and said sub-camera are set to be angles such that said three-dimensional distance distribution being substantially left-right symmetric with respect to a central axis of a vehicle parallel to the forward direction of the vehicle and said shooting direction being parallel to the central axis.

7. The stereo camera apparatus as recited in claim 6, wherein the optical axis of said sub-camera is inclined toward said sub-camera side with respect to the optical axis of said main camera in order to provide a search margin in a comparative image photographed by said sub-camera to enable detection of an infinite distance corresponding point positioned at an end of said sub-camera side in a reference image taken by said main camera.

8. A stereo camera apparatus comprising:
    a main camera for taking a photograph of an object; and
    a sub-camera for taking a photograph of said object from a point of view different from a point of view of said main camera, said main camera and said sub-camera being disposed with respect to each other by a predetermined spacing,
    a shooting direction of said stereo camera is substantially perpendicular to said predetermined spacing in a baseline between the main camera and the sub-camera,
    image processing means for calculating a three-dimensional distance distribution of said object on a positional difference between a region in a reference image photographed by said main camera and a corresponding area in a comparative image photographed by said sub-camera to an image signal of said region, wherein said corresponding area is searched in a striplike area having a predetermined length which extends from a position substantially corresponding to said region, said positional difference is obtained from an area which is capable of setting search area inside of said comparative image, wherein said main camera and said sub-camera are inclined toward the main camera side with a predetermined angle with respect to the shooting direction defined by each of the optical axes and the shooting direction, wherein angles of inclination of said main camera and said sub-camera are set to be such angles that said three-dimensional distance distribution is substantially left-right symmetric with respect to the shooting direction, wherein a first acute angle defined between said optical axis of said main camera and the baseline is smaller than a second acute angle defined between said optical axis of said sub-camera and the baseline;

wherein angles of inclination of said main camera and said sub-camera are set to be angles such that said three-dimensional distance distribution being substantially left-right symmetric with respect to a central axis of a vehicle parallel to the forward left-right symmetric with respect to a central axis of a vehicle parallel to the forward direction of the vehicle, and said shooting direction being parallel to the central axis.

9. The stereo camera apparatus as recited in claim 8, wherein the first acute angle is smaller than the second acute angle in order to provide a search margin in a comparative image photographed by said sub-camera to enable detection of an infinite distance corresponding point positioned at an end of said sub-camera side in a reference image taken by said main camera.

10. A stereo camera apparatus comprising:

a main camera for taking a photograph of an object; and a sub-camera for taking a photograph of said object from a point of view different from a point of view of said main camera, said main camera and said sub-camera being disposed with respect to each other by a predetermined spacing, a shooting direction of said stereo camera is substantially perpendicular to said predetermined spacing in a baseline between the main camera and the sub-camera, image processing means for calculating a three-dimensional distance distribution of said object based on a positional difference between a region in a reference image photographed by said main camera and a corresponding area in a comparative image photographed by said sub-camera to an image signal of said region, wherein said corresponding area is searched in a striplike search area having a predetermined length which extends from a position substantially corresponding to said region, said positional difference is obtained from an area which is capable of setting said search area inside of said comparative image, wherein optical axes of said main camera and said sub-camera are inclined toward the main camera side with a predetermined angle with respect to the shooting direction defined by each of the optical axes and the shooting direction, wherein angles of inclination of said main camera and said sub-camera are set to be such angles that said three-dimensional distance distribution is substantially left-right symmetric with respect to the shooting direction, wherein angles of inclination of said main camera and said sub-camera are set to be angles that said three-dimensional distance distribution being substantially left-right symmetric with respect to a central axis of a vehicle parallel to a forward direction of the vehicle, and the shooting direction being parallel to the central axis;

wherein said angles of inclination of said main camera and said sub-camera correspond to a displacement between a first line on said reference image and a second line on said reference image, said first line is a line for setting a three-dimensional distance distribution, generating area on said reference image substantially symmetrical on left and right sides with respect to said first line in said reference image said second line is a vertical line perpendicular to said optical axis of said main camera in said reference image.

* * * * *